United States Patent [19]
Winzen et al.

[11] Patent Number: 5,865,475
[45] Date of Patent: Feb. 2, 1999

[54] CONNECTION BETWEEN A BUILDING COMPONENT AND A PIPE-SHAPED LINE ELEMENT

[75] Inventors: Wilfried Winzen; Eberhard Wildermuth, both of Pforzheim, Germany

[73] Assignee: Witzenmann GmbH Metallschlauch-Fabrik Pforzheim, Pforzheim, Germany

[21] Appl. No.: 835,883

[22] Filed: Apr. 8, 1997

[30] Foreign Application Priority Data

Apr. 12, 1996 [DE] Germany ............... 296 06 683 U

[51] Int. Cl.⁶ ........................................... F16L 21/00
[52] U.S. Cl. ............... 285/226; 285/288.1; 285/367; 285/368; 285/906
[58] Field of Search ................ 285/226, 288.5, 285/288.1, 227, 228, 229, 334.5, 367, 368, 906

[56] References Cited

U.S. PATENT DOCUMENTS

| | | | |
|---|---|---|---|
| 1,829,236 | 10/1931 | Perkins | 285/229 |
| 2,113,211 | 4/1938 | Lake | 285/334.5 X |
| 2,158,620 | 5/1939 | Eastman | 285/332.3 X |
| 2,216,468 | 10/1940 | Farrar | 285/226 X |
| 2,323,912 | 7/1943 | Johnson | 285/334.5 |
| 3,096,104 | 7/1963 | Browning | 285/226 |
| 5,375,854 | 12/1994 | Carlisle et al. | |
| 5,498,036 | 3/1996 | Kingford | 285/334.5 X |

FOREIGN PATENT DOCUMENTS

| | | | |
|---|---|---|---|
| 998495 | 1/1952 | France | 285/226 |
| 8533984 U | 4/1986 | Germany | |
| 9420502U1 | 7/1995 | Germany | |
| 415495 | 6/1947 | Italy | 285/228 |

*Primary Examiner*—Dave W. Arola
*Attorney, Agent, or Firm*—Venable; George H. Spencer; Catherine M. Voorhees

[57] ABSTRACT

A connection between a building component in the form of a pipe, a mounting part, a housing or the like and a pipe-shaped line element of metal. The building component has an essentially radially extending, ring-shaped contact surface, against which a ring-shaped collar arranged on the line element is tensioned by fastening means that grip behind the collar. In the region between its inside and outside diameter, the collar has at least one axial thickening that extends ring-shaped around the axis for the line element, and that the thickening is produced by axially compressing at least one radially outward extending and at least one radially inward extending annular undulation, arranged adjacent in axial direction, of the wall that forms the collar.

20 Claims, 4 Drawing Sheets

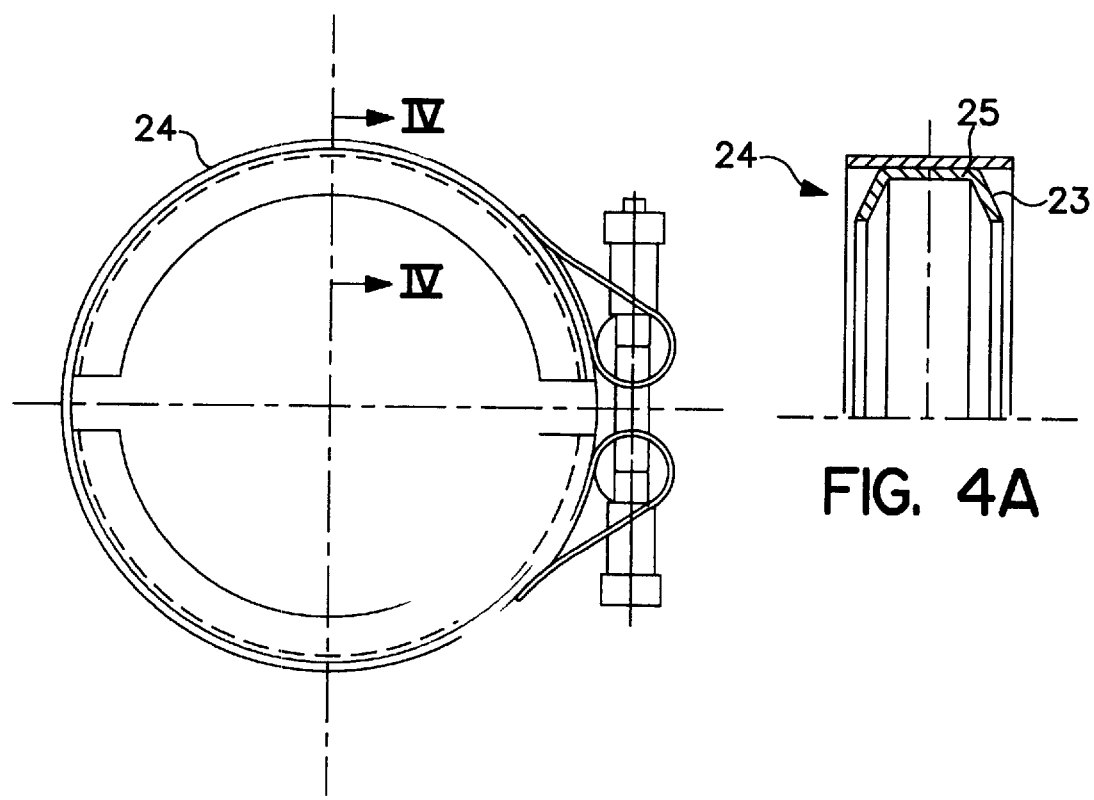
FIG. 4
FIG. 4A
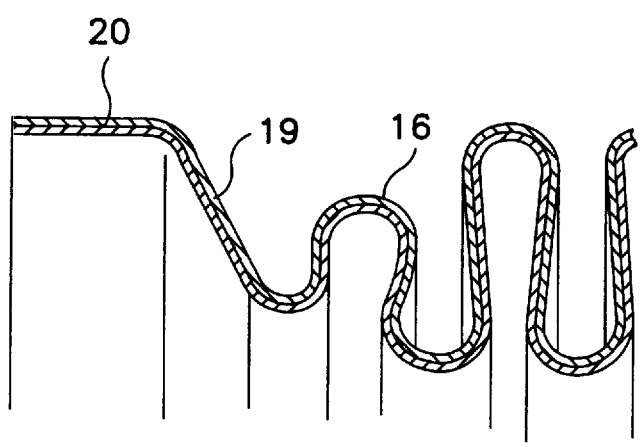
FIG. 5

CONNECTION BETWEEN A BUILDING COMPONENT AND A PIPE-SHAPED LINE ELEMENT

CROSS-REFERENCE TO RELATED APPLICATION

This application claims the priority of Patent Application Serial No. DE 29606683.4 filed in Germany on Apr. 12, 1996.

BACKGROUND OF THE INVENTION

The present invention relates to a connection between a building component in the form of a pipe, a mounting part, a housing or the like and a pipe-shaped line element of metal, wherein the building component has an essentially radially extending, ring-shaped contact surface in the region of its end facing the line element, against which there is clamped a ring-shaped collar that extends essentially parallel to the contact surface, the collar being arranged on the end of the line element and being clamped with the aid of fastening means that grip behind the collar and thereby fit against it.

In such arrangements, the line element can be a plain ended pipe, in particular a thin-walled pipe. However, the line element may be corrugated pipe, be a corrugated hose or a corrugated sheathing hose with spiral or ring-shaped undulations. As a rule, the line element has a circular cylindrical cross section, but other cross sections for the connection, in particular oval shapes, may be provided.

The building component may, for example, be a pipe, a mounting part, a housing or the like. More specifically, one can point to the valve housing of an arrangement for recycling exhaust gases, where a hot and aggressive exhaust gas flows through the line element and thus also the connection. Not only must the line element be temperature and corrosion resistant in this case, but the connection must also be absolutely leakproof to prevent the escape of exhaust gases.

For a connection of the type as described above, the collar is clamped against the contact surface of the building component. If the building component is provided with a flange at the end, this can be done by permitting a flange ring to grip behind the collar, which is then braced with the aforementioned flange, for example through screws. Alternatively the building component may have a ring-shaped thickening at the end or in the end region with essentially trapezoid axial cross section. The correspondingly slanted collar is placed beside the slanted surface of this thickening that faces the line element, wherein the total unit is then gripped, for example, by a clamp with a V-shaped cross section. By tightening the clamp, the thickening and the collar are pressed together axially. Another alternative is the provision of a screw connection between the housing and a nut, which tensions the collar against the contact surface.

In one example of such a connection, a ring-shaped seal ring is inserted between seating surface and collar to produce the necessary seal. However, this raises the costs for the connection and requires particular attention and additional measures when producing the connection because this component is easily lost.

Attempts have also been made to counter this by stamping a circular, axially projecting crimp into the collar. Even with this, however, a complete seal cannot be achieved with certainty because the crimp is again flattened by the tension forces generated when the connection is made, wherein dislocations or a folding of the material that forms the collar occur, which in particular stand in the way of a hermetic seal. This is especially true if the line element, and thus as a rule also the collar, have particularly thin walls for reasons of flexibility, where such a crimp hardly provides a significant internal stiffness.

It is, therefore, the object of the present invention to improve a connection of the above described type in such a way that it meets the requirements of a complete seal, without requiring an additional seal, but which at the same time has a simple, cost-effective and stable design.

SUMMARY OF THE INVENTION

With the above object in view the collar has at least one axial thickening that fits with a closed, ring-shaped design around the axis of the line element in the region between its inside and outside diameter, and the thickening is created through compressing at least one radially outward extending and, arranged next to it in axial direction, at least one radially inward extending annular undulation of the wall that forms the collar.

As a result, more wall material accumulates in addition to the collar material where normally a separate seal ring is installed. First of all, this ensures that the collar essentially makes contact with the contact surface only along a radially limited annular surface, so that the total contact force is transmitted via a correspondingly very small contact area. Among other things, this also guarantees that the material cannot be pushed away at the spot where the seal must be ensured because it is compressed extensively and therefore does not have any way to yield. Finally, this also ensures that the collar experiences a stiffening in the region of the thickening, which effectively counters a distortion of the material or even a folding.

It is not particularly difficult to produce the annular undulations that are used to create the thickening since this coincides with the production of undulations for a corrugated pipe or a corrugated hose, so that the aforementioned annular undulations can be installed especially easily and simultaneously with the production of the line element as corrugated pipe or corrugated hose.

As follows from the above already, the inside diameter of the annular undulation directed toward the inside and the outside diameter of the annular undulation directed toward the outside, which deviate from the inside or outside diameter of the collar, can be positioned relatively close, so that the thickening of the collar in radial direction is relatively small, with the tendency that the smaller the thickening in radial direction, the higher the sealing surface pressure at the thickening.

Depending on the individual circumstances and especially for a very thin-walled line element, at least one additional annular undulation can be added, arranged adjacent in axial direction, in addition to an annular undulation facing toward the inside and the one facing toward the outside, in order to control the amount of the aforementioned material that accumulates in the thickening region.

It is likewise possible to provide the collar with two ring-shaped thickenings, for example, which would have to be arranged side by side at a distance in a radial direction of the collar. In order to prepare two such thickenings, it would only be necessary to position the annular undulations forming them in correspondingly different radial positions.

It is useful if collar and thickening are formed from the associated end of the line element. However, it is also possible to join the collar with thickening to the end of the line element by using a joining method, for example, welding.

With respect to the contact surface, the same can be formed by a flange at the end of the building component or even by a thickening, for example a thickened annular edge or a crimp at the end of the building component or in the region of this end, wherein the flange or the thickening again can have an essentially trapezoid design in the axial cross section, as previously described, so that in addition to the screws that are considered as fastening means for flanges, clamping rings can be used as fastening means, such as V-clips.

All the designs described so far can also have an essentially cylindrical segment of the collar that adjoins the outside circumference of the collar and which fits flush against the outer circumferential surface of the building component or the flange or the thickening. This results in a clean mutual centering and otherwise contributes to the stability of the connection, in particular if the clamping ring also fits flush against the cylindrical segment of the collar with a circumferential segment that extends in axial direction.

With respect to the design for the line element, a connection according to the present invention is suitable in particular for connections with thin-wall line elements, wherein the application is not limited only to single-wall line elements. Rather, multilayer line elements are considered as well, wherein not all layers need be made of metal, but materials can be considered for the individual layers, depending on the requirements.

BRIEF DESCRIPTION OF THE DRAWINGS

These and other features and advantages of the present invention will be further understood from the following detailed description of the preferred embodiments with reference to the accompanying drawings in which:

FIG. 4 shows a V-clip for securing the connection according to the invention.

FIG. 4a is a view of the V-clip taken along section IV—IV of FIG. 4.

FIG. 5 shows a modification of FIG. 2 where the line element is of multi-layer design.

DETAILED DESCRIPTION OF THE PREFERRED EMBODIMENTS

Figure 1:
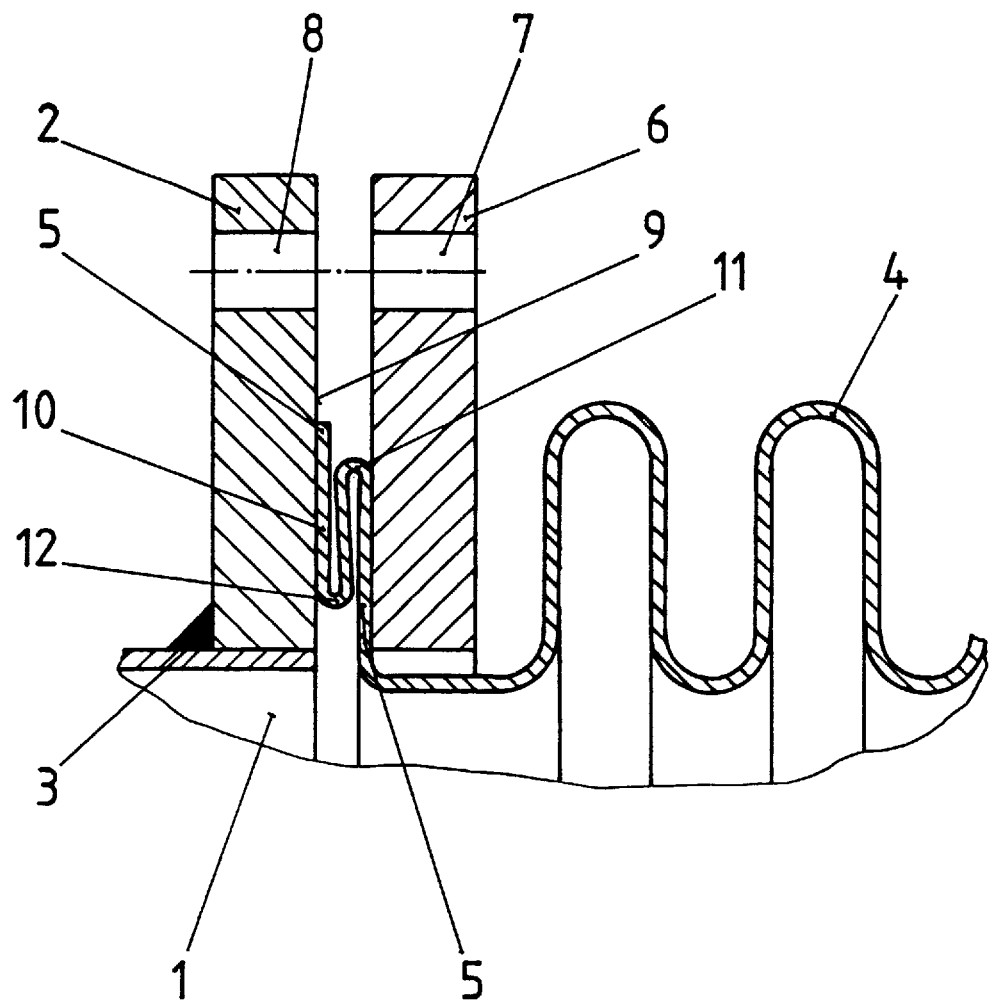
FIG. 1 shows segments of an axial cut through an inventive connection.

FIG. 1 shows the end of a pipe 1 which has a flange ring 2 attached to its outside with a welding 3, as well as a line element 4 in the form of a circular corrugated pipe, hose or sheathing hose, the latter having a collar 5 that is radially bent up to the outside from the end that faces the pipe 1. A flange ring 6 is inserted behind the collar 5, which has axially parallel bores 7 distributed across the circumference that are aligned with bores 8 on the flange ring 2. Tightening screws can be inserted through the bores 7, 8 for tightening the flange rings 2, 6 relative to each other, so that the collar 5 is clamped between them to form a seal and is thus pressed against the contact surface 9 of the flange ring 2.

In order to increase the seal for this connection between pipe 1 and line element 4 considerably, the collar 5 has a circular, closed thickening 10 around the circumference, which is compressed when the collar is clamped between flange rings 2 and 6, thereby resulting in a relatively small ring-shaped surface with an extremely high, uninterrupted sealing effect. The thickening 10 is formed by a radially outward extending annular undulation 11 and an adjoining, radially inward extending annular undulation 12 in axial direction, wherein the annular undulations are compressed or pressed against each other in an axial direction. As shown, the outside diameter for the annular undulation 11 and the inside diameter for the annular undulation 12 are located between the inner and the outer diameter of the collar 5, wherein the radial extension of the thickening 10 can be controlled by selecting the aforementioned diameters for the annular undulations 11 and 12.

Figure 2:
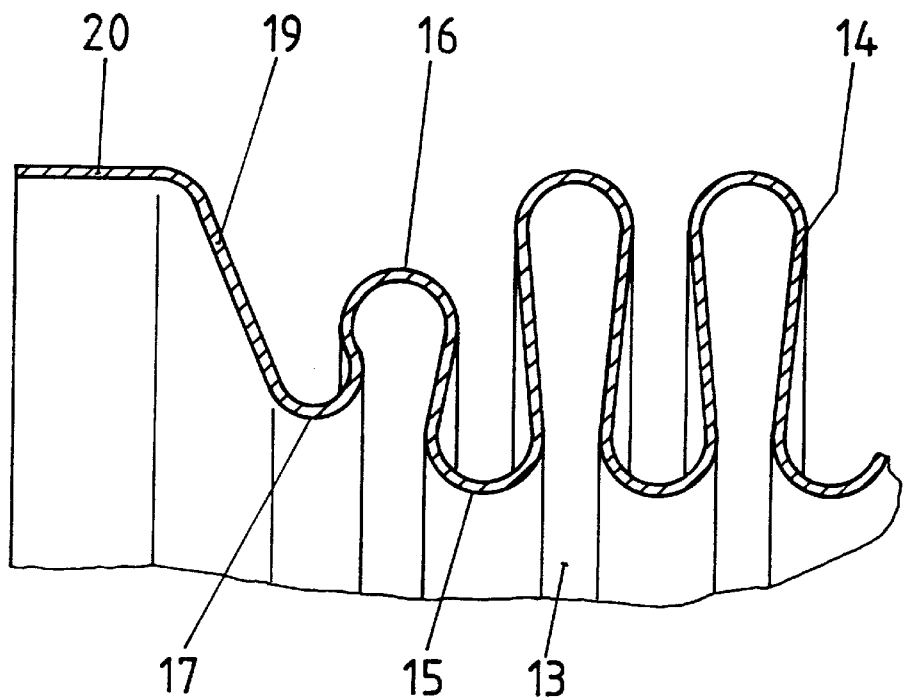
FIG. 2 shows the end of a line element in a partial axial cut and at an intermediate stage of production.

FIG. 2 shows a line element 13 in the form of a corrugated pipe with uniformly large annular undulations 14 directed toward the outside and annular undulations 15 directed toward the inside. The last two annular undulations 16 and 17 are again reduced with respect to annular undulation 16 in the outside diameter, relative to annular undulation 14, or have an expanded inside diameter with respect to the inward directed annular undulation 17, relative to annular undulation 15, which results in the thickening 18 following the respective axial deformation, as can be seen from the installed condition in FIG. 3. As for the example according to FIG. 1, the collar 19 otherwise is formed by the flank for annular undulation 17 that flows out toward the left with respect to the drawing, as well as the flank for annular undulation 16 that flows in from the right.

An essentially cylindrical segment 20 also adjoins the free end of the collar 19. A multilayer line element and collar, similar to that of FIG. 2, is shown in FIG. 5.

Figure 3:
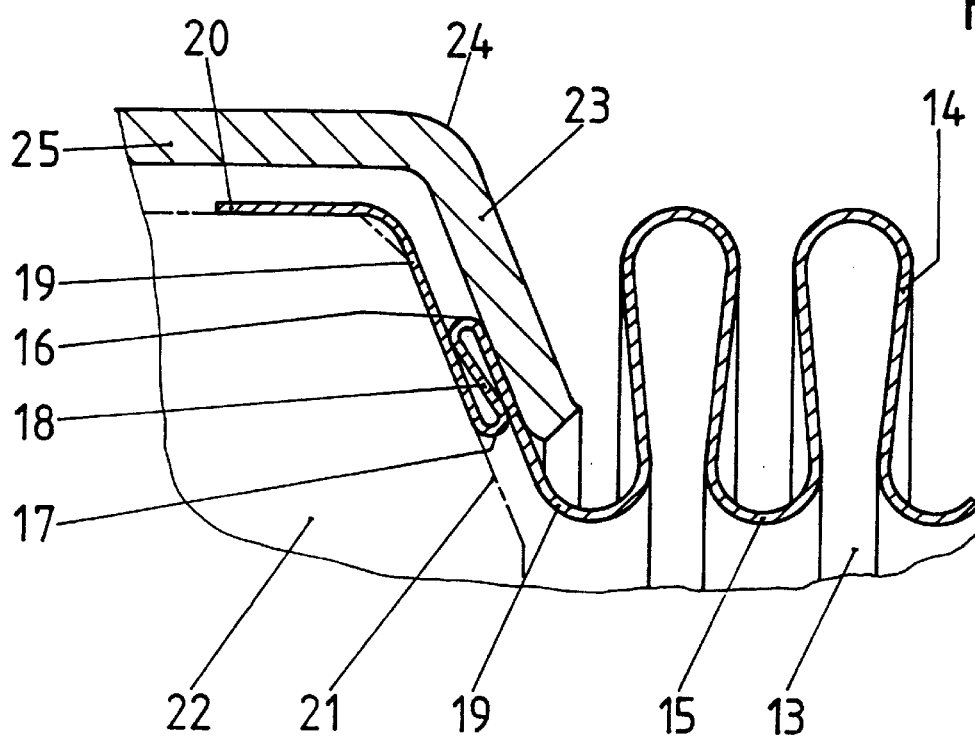
FIG. 3 shows the line element according to FIG. 2 as the finished and installed product.
Figure 6:
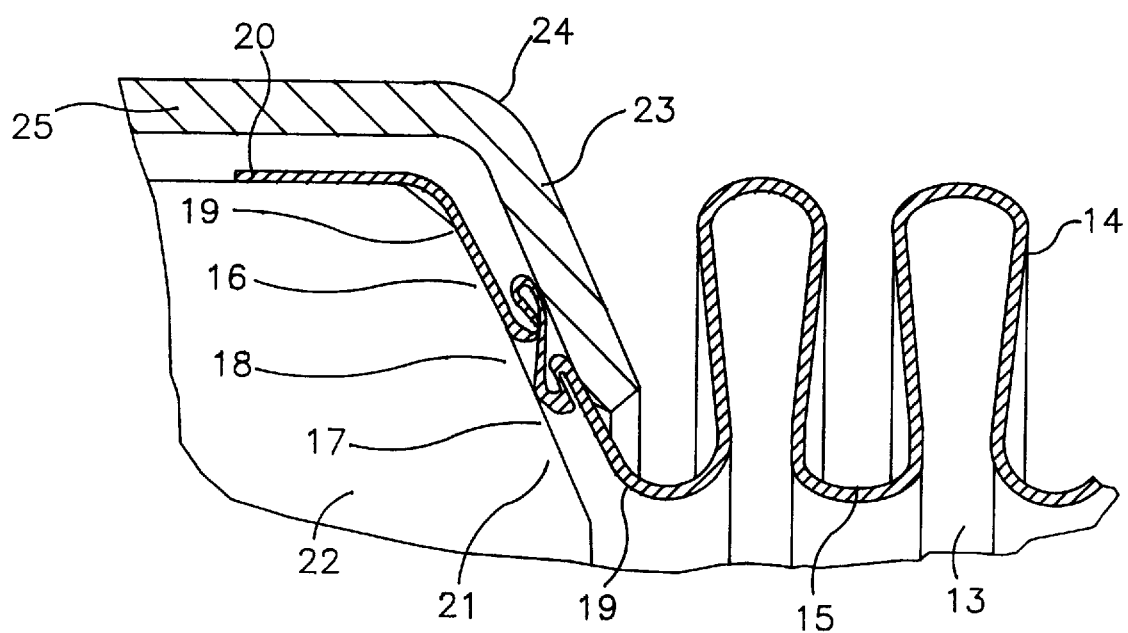
FIG. 6 shows a modification of FIG. 3 where the ring-shaped thickenings of the collar are arranged side-by-side in a radial direction.

The end of line segment 13 that is shown in FIG. 2 in an intermediate production stage is shown in FIG. 3 in the installed position, where it rests with the collar 19 against the slanted flank 21 of a trapezoid thickening 22, shown with dash-dot line, at the end of a building component that is not shown. The collar 19 is spanned or clamped behind by the leg 23 of a V-clip 24, shown only partially, which otherwise grips with a corresponding leg and in the known way the thickening 22 on the side opposite leg 23.

Parallel to the cylindrical segment 20, the V-clip has a circumferential segment 25 that extends in an axial direction, which is at a radial distance from the cylindrical segment 20 for the case at hand. However, the V-clip 24 can be designed such that if the V-clip is tensioned, the circumferential segment 25 comes to rest against the segment 20, if only slightly.

The embodiments shown in FIGS. 1 and 3 have in common that the collar 5 or 19 has a thickening caused by a material accumulation, which on the one hand can be produced easily in the conventional way and, on the other hand, results in a stiffening of the collar and ensures a completely tight connection. In each case, the thickening 10 or 18 is produced by compressing two annular undulations 11, 12 or 16, 17. However, for very thin-walled line segments 4 or 13 in particular, it is possible to increase the material accumulation for the thickening in a very simply way by adding at least one other annular undulation. With reference to FIG. 2, this can occur for example in that the two annular undulations 15 and 14 to the right of annular undulation 16 of line element 13 are provided with the radial dimensions of the annular undulations 16 and 17 to be able to include these two annular undulations also when forming the thickening of the collar.

It will be understood that the above description of the present invention is susceptible to various modifications, changes and adaptations, and the same are intended to be comprehended within the meaning and range of equivalents of the appended claims.

What is claimed is:

1. A connection between a building component in the form of a pipe and a pipe-shaped line element of metal, said connection comprising:

a building component having an end with an essentially radially extending, ring-shaped contact surface;

a ring-shaped collar arranged on the end of the line element and facing and extending essentially parallel to the contact surface of the building component; and fastening means for pressing said collar against said contact surface, said fastening means gripping behind said collar and fitting flush against it; where said collar has, in the region between its inside and outside diameter, at least one axial thickening that extends ring-shaped around the axis for the line element, said thickening comprising at least one radially outward directed annular undulation and at least one radially inward directed annular undulation and being formed by axial compression, and at least one of the radially outward pointing annular undulations has a smaller outside diameter than the outside diameter of the line element and at least one of the radially inward pointing annular undulations has a larger diameter than the inside diameter of the line element;

said annular undulations being arranged adjacent in axial direction to one another.

2. A connection according to claim 1, wherein the difference in diameters between the radially outward pointing and the radially inward pointing annular undulations is relatively small.

3. A connection according to claim 1, comprising a plurality of ring-shaped thickenings of the collar, the same being arranged side-by-side in a radial direction and at a distance to each other.

4. A connection according to claim 1, wherein the collar and thickening are formed from the associated end of the line element.

5. A connection according to claim 1, wherein the collar is connected to the end of the line element through a joining method.

6. A connection according to claim 1, wherein the collar is welded to the end of the line element.

7. A Connection according to claim 1, wherein the contact surface is formed by a flange on the end of the building component.

8. A Connection according to claim 7, wherein the contact surface is formed by a thickening of a thickened ring-shaped edge at the end of the building component or in the region of this end.

9. A Connection according to claim 7, wherein the flange has an essentially trapezoid shape in the axial cross section.

10. A Connection according to claim 1, wherein the fastening means are connected through screw fasteners with the contact surface of the building component.

11. A Connection according to claim 1, wherein the fastening means are formed by a clamping ring that also holds the end of the building component.

12. A Connection according to the claim 11, wherein the clamping ring has a circumferential segment that extends in an axial direction and fits radially from the outside against the cylindrical segment of the collar.

13. A Connection according to claim 11, wherein the clamping ring is joined by a clamping means in the area where it is divided.

14. A connection according to claim 13, wherein said clamping means includes at least one tightening screw.

15. A connection according to claim 11, wherein said clamping ring is a V-clip.

16. A Connection according to claim 11, wherein the clamping ring is divided, and at least one point along the circumference being detachably joined in the area where it is divided.

17. A Connection according to claim 1, wherein an essentially cylindrical segment of the collar adjoins the outside circumference of the collar, which fits flush against the outer circumferential contact surface of the building component end.

18. A Connection according to claim 1, wherein the line element has a thin-wall design.

19. A connection according to claim 1, wherein said collar has a thin-wall design.

20. A Connection according to claim 1, wherein at least one of said line element and collar has a plurality of layers.

* * * * *